US005724476A

United States Patent [19]
Suzuki

[11] Patent Number: 5,724,476
[45] Date of Patent: Mar. 3, 1998

[54] METHOD AND APPARATUS FOR EXTENDING AND REPRODUCING COMPRESSED MOVING PICTURES

[75] Inventor: Mitsuyoshi Suzuki, Tokyo, Japan

[73] Assignee: Mitsubishi Denki Kabushiki Kaisha, Tokyo, Japan

[21] Appl. No.: 563,624

[22] Filed: Nov. 28, 1995

[30] Foreign Application Priority Data

Jul. 18, 1995 [JP] Japan ................... 7-181562

[51] Int. Cl.⁶ .................. H04N 5/917; H04N 5/91
[52] U.S. Cl. ......................... 386/109; 386/66
[58] Field of Search ................. 386/66, 85, 86, 386/89, 90, 109, 113, 13, 14, 21, 27, 33; 348/423; H04N 5/917, 5/91

[56] References Cited

U.S. PATENT DOCUMENTS 5,502,573   3/1996   Fujinami ................. 358/339

*Primary Examiner*—Robert Chevalier
*Attorney, Agent, or Firm*—Oblon, Spivak, McClelland, Maier & Neustadt, P.C.

[57] ABSTRACT

A method and apparatus for reproducing normally a picture of a recording system by operating the recording system and a display system asynchronously, and by holding and/or skipping a picture frame or field of the display system. The method for extending and reproducing compressed moving pictures includes asynchronizing data transferring a clock from a recording unit with a display system clock and then setting a hold or skip threshold which is in advance of a recording system time by a first predetermined frame (field) time. A timing is corrected by holding or skipping the display system time for one frame (field) when a display system time becomes equal to the hold or skip threshold. Frames (fields) of the display system which are closest to the recording system time are then displayed when the display system time is held or skipped for the one frame (field).

33 Claims, 16 Drawing Sheets

METHOD AND APPARATUS FOR EXTENDING AND REPRODUCING COMPRESSED MOVING PICTURES

BACKGROUND OF THE INVENTION

1. Field of the Invention

The present invention relates to a method and apparatus for extending and reproducing compressed moving pictures. More particularly, the invention relates to a method and apparatus for reproducing normally a picture by operating a recording system and display system asynchronously, and by holding and/or skipping the picture frame or field of display system.

2. Description of the Prior Art

In picture compression and extension by MPEG, an original picture is compressed without losing any pieces, and then transmitted or stored. In a case that the compressed picture is stored, the storage is carried out at the same frame speed as that of the original picture. Therefore, it is generally necessary to clock-synchronize during intake of original picture, compression, storing, extension, and display, and which needs circuits such as a PLL and so on. Rapid reproducing, slow reproducing, and reverse reproducing are desired for particular reproducing, but it is difficult to carry out smooth reproducing because the conventional stroboscopic reproducing uses only the frame of inner frame coding.

MPEG is classified into I picture of inner frame coding, P picture of forecasting inter-frame coding from ahead, and B picture of forecasting inter-frame coding from both ahead and back. B picture can be skipped since it is not used for inter-frame coding from back.

FIG. 16 is a block diagram which shows a conventional apparatus for extending and reproducing compressed moving pictures. In FIG. 16, the conventional apparatus for extending and reproducing compressed moving pictures comprises a recording system clock generator 1, a recording system clock 2, signal a recording unit or receiving unit 3, buffer memory 5, decoder 7, decoding memory 9, display 13, monitor 15, and display system clock generator 20. Where the recording system or recording unit refers to a system in which the picture of CD-ROM and so on is recorded, or a CD-ROM unit itself, for instance. Also, the reception system or receiving unit refers to a receiving system or a receiving unit like television units and so on which receives pictures through a communication line.

Operation of the apparatus for extending and reproducing compressed moving pictures using a conventional technique will be explained below. Using recording system clock 2 generated by recording system clock generator 1, recorded data 4 which is read out of recording system 3 and coded is transferred to and stored in buffer memory 5. In this case of the recording system, recording unit 3 is a source of compressed picture data, and in a case of the receiving system, receiving unit 3 has a function to relay the compressed picture data from the line. Decoded picture data 6 which is read out of buffer memory 5 in response to the demand of decoder 7 is transferred to decoder 7. Decoder 7 decodes the picture data, which is stored as stored picture data 8 in decoding memory 9 for inter-frame decoding or for display. Picture to be displayed is transferred as decoded picture 10 from decoding memory 9 to display 13. The transferred picture is convened to the picture signal for display at display 13. The synchronizing signal from display system clock 12 is added to the picture signal which is outputted as display picture 14 to monitor 15. Display system clock generator 20 synchronizes with recording system clock 2 from recording system clock generator 1 by a PLL and so on to generate display system clock 12. Decoder 7 carries out decoding for every frame. Decoder starting pulse 19 which starts decoding for every frame is generated at display 13 at a constant time for every frame. In this case, since recording system clock 2 synchronizes with display system clock 12, the number of frames of the recording system is the same as that of display system in macro average, which does not result in disorder of the picture even if a long time decoding and reproducing are carried out.

As mentioned above, in the prior art, it is necessary to synchronize the recording system clock 2 with the display system clock 12, which needs to add circuits such as a PLL and so on.

Further, it is impossible to carry out normal reproducing of pictures between the recording unit and display unit having different frame speeds in the conventional art.

Further, it is impossible to carry out smooth particular reproducing such as rapid reproducing and slow reproducing, and also only the stroboscopic reproducing may be available by using only the frame of inner frame decoding.

SUMMARY OF THE INVENTION

It is an object of the present invention to provide a method and apparatus for extending and reproducing compressed moving pictures which reproduce the picture normally between a recording unit and display unit each having different frame speeds, by causing a recording system and display system to operate separately using different clock sources, and by skipping or holding picture frames or fields of the display system to match an operation speed of the display system with an operation speed of the recording system.

According to one aspect of the invention, a method for extending and reproducing compressed moving pictures comprises synchronizing data transferring clock from a recording unit or receiving unit (referred to recording unit) with a display system clock; setting a hold threshold which is in advance of a recording system or receiving system time (referred to recording system time) by a first predetermined frame time; correcting a timing by holding the display system time by one frame when the display system time becomes equal to said hold threshold; and displaying frames of the display system which are closest to a recording system time.

According to another aspect of the present invention, a method for extending and reproducing compressed moving pictures comprises asynchronizing data transferring clock from a recording unit with a display system clock; setting a skip threshold which is behind from the recording system by a first predetermined frame time; correcting a timing by skipping the display system time by one frame when a display system time becomes equal to said skip threshold; and displaying frames of a display system which are closest to a recording system time.

According to further aspect of the present invention, a method for extending and reproducing compressed moving pictures comprises asynchronizing data transferring clock from a recording a unit with a display system clock; setting a hold threshold which is in advance of a recording system by a first predetermined frame time; correcting a timing by holding the display system time by one frame when the display system time becomes equal to said hold threshold; setting a skip threshold which is behind from the recording system by a first predetermined frame time; correcting a timing by skipping the display system time by one frame when the display system time becomes equal to said skip threshold; and displaying frames of the display system which are closest to recording system time.

According to further aspect of the present invention, an apparatus for extending and reproducing compressed moving pictures which comprises a recording unit having a picture source, a recording system clock generator for forming a clock synchronized with the picture source, a buffer memory for storing a read out picture data, a decoder for decoding the picture data, a display for converting the picture data to an image signal for display, a monitor for displaying the picture, and a display system clock generator for generating a clock for display, comprises: a decoding start control portion comprising a recording system counter for counting a recording system clock, a display system counter for counting a display system clock, and a comparator for comparing the recording system counter with the display system counter which are operating asynchronously each other; wherein said comparator generates a hold pulse and a decoder starting pulse when a value of the display system counter becomes equal to a hold threshold which is in advance of value a of the recording system counter by ½ frame time, and then said comparator corrects the display system by holding the display system frame by one frame; and said display displays the frame of the display system which is closest to the recording system frame.

According to a further aspect of the present invention, an apparatus for extending and reproducing compressed moving pictures which comprises a recording unit having a picture source, a recording system clock generator for forming a clock synchronized with the picture source, a buffer memory for storing a read out picture data, a decoder for decoding the picture data, a display for converting the picture data to a image signal for display, a monitor for displaying the picture, and a display system clock generator for generating a clock for display, comprises: a decoding start control portion comprising a recording system counter for counting a recording system clock, a display system counter for counting a display system clock, and a comparator for comparing the recording system counter with the display system counter which are operating asynchronously each other; wherein said comparator generates a hold pulse and a decoder starting pulse when a value of the display system counter becomes equal to a skip threshold which is behind from the value of the recording system counter by ½ frame time, and then said comparator corrects the display system by skipping the display system frame by one frame; and said display displays the frame of the display system which is closest to the recording system frame.

According to a further aspect of the present invention, an apparatus for extending and reproducing compressed moving pictures which comprises a recording unit having a picture source, a recording system clock generator for forming a clock synchronized with the picture source, a buffer memory for storing a read out picture data, a decoder for decoding the picture data, a display for converting the picture data to a image signal for display, a monitor for displaying the picture, and a display system clock generator for generating a clock for display, comprises: a decoding start control portion comprising a recording system counter for counting a recording system clock, a display system counter for counting a display system clock, and a comparator for comparing the recording system counter with the display system counter which are operating asynchronously each other; wherein said comparator generates a hold pulse (or skip pulse) and a decoder starting pulse when a value of the display system counter becomes equal to a hold threshold which is in advance of a value of the recording system counter by ½ frame time, or when a value of the display system counter becomes equal to a skip threshold which is behind from a value of the recording system counter by ½ frame time, and then said comparator corrects the display system by holding or by skipping the display system frame by one frame; and said display displays the frame of the display system which is closest to the recording system frame.

DETAILED DESCRIPTION OF PREFERRED EMBODIMENTS

Embodiment 1

Figure 1:
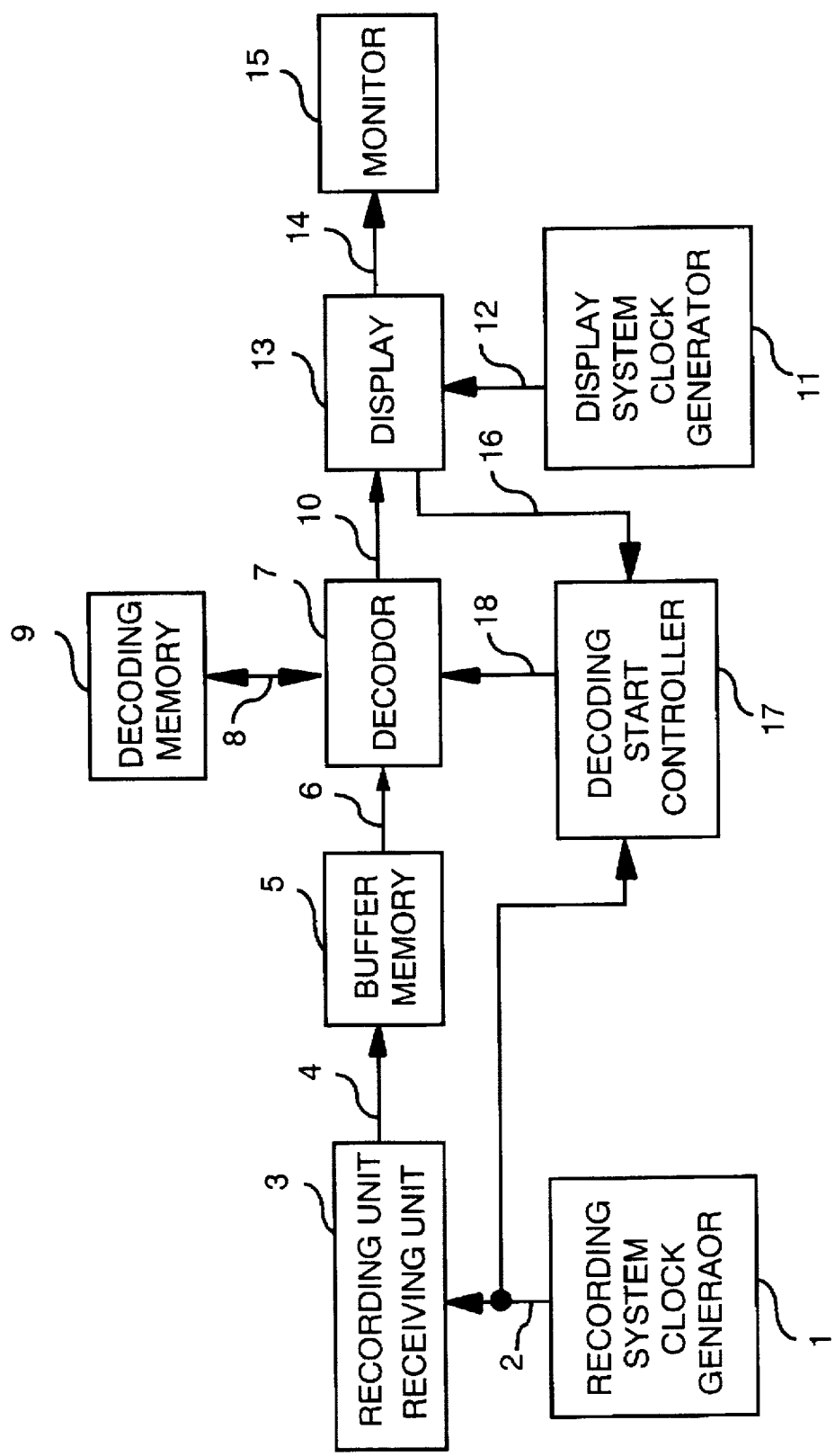
FIG. 1 shows an apparatus for extending and reproducing compressed moving picture of an embodiment of the present invention.
Figure 16:
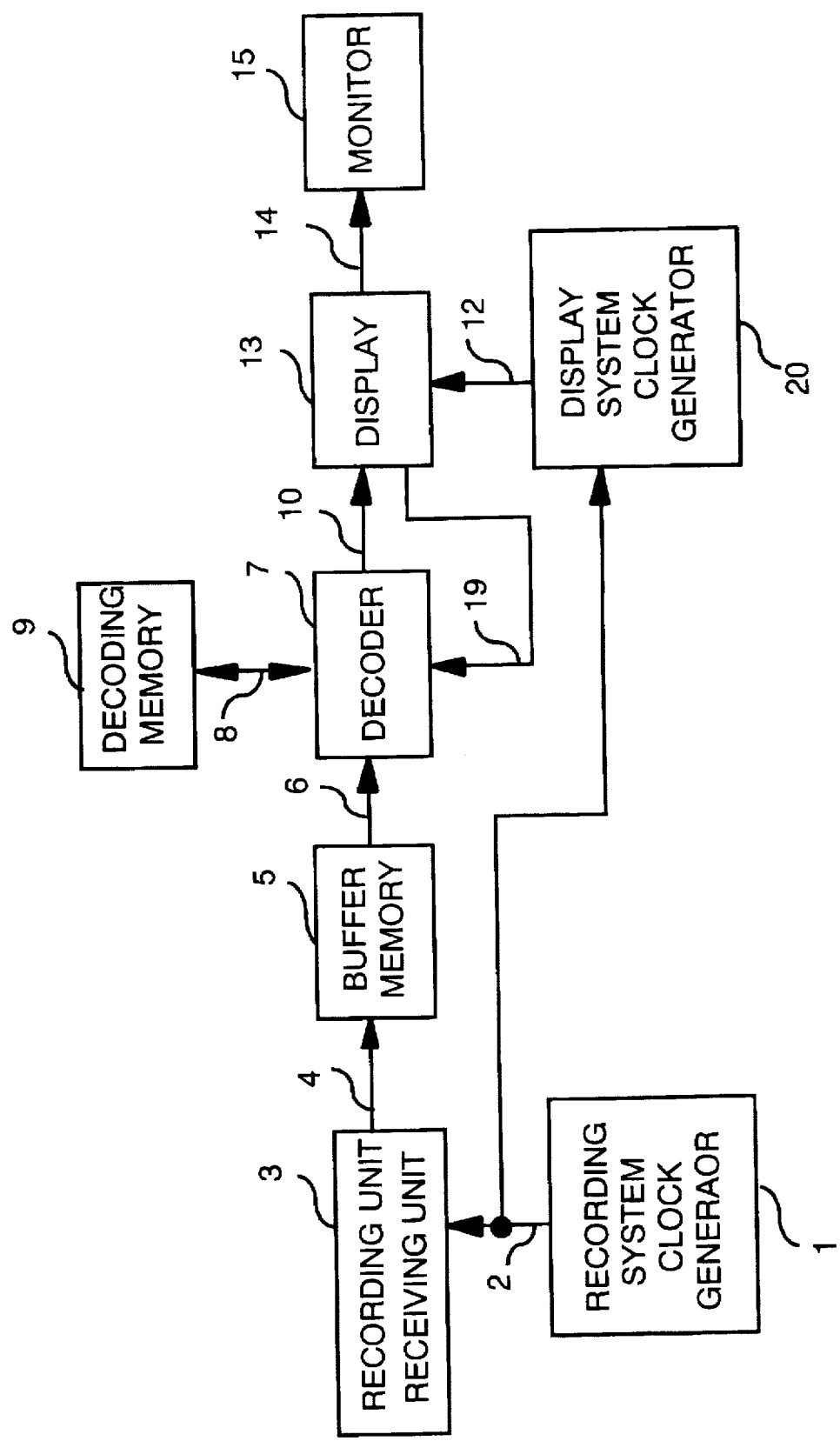
FIG. 16 shows a conventional apparatus for extending and reproducing compressed moving pictures.

FIG. 1 shows an apparatus for extending and reproducing compressed moving pictures of an embodiment of the present invention. In FIG. 1, the system comprises a display system clock generator 11, a decoding start controller 17. The elements having the same reference numbers in FIG. 1 are the same portions or the corresponding portions in FIG. 16. Accordingly the detailed explanation of the same portions is omitted.

An operation of the apparatus for extending and reproducing compressed moving pictures is explained as follows using FIG. 1. The general operation is explained below wherein the same elements operate almost the same as that in the conventional construction. Using recording system clock 2 which is generated by recording system clock generator 1, recorded data 4 which is read out of recording system 3 and coded is transferred and stored in buffer memory 5. In a case of the recording system, recording unit 3 is a source of compressed picture data, and functions to relay the compressed picture data from the line. Decoded picture data 6 which is read out of buffer memory 5 is transferred to decoder 7 in response to the demand from decoder 7. Decoder 7 decodes the picture data. The decoded data is stored in decoding memory 9 as stored picture data 8 for inter-frame decoding or for display.

The picture to be displayed is transferred as decoded picture 10 from decoding memory 9 to display 13. The transferred picture is converted to a picture signal for display at display 13. The synchronizing signal from display system clock 12 is added to the picture signal which is outputted as display picture 14 to monitor 15. The present invention is different from the conventional construction in that display system clock generator 11 is equipped asynchronously with and independently from recording system clock generator 1, which may allow a small margin of accuracy between the display system clock 12 and the recording system clock 2. Decoding start controller 17 generates hold/skip and decoding pulse 18 in response to display synchronizing signal 16 and recording system clock 2. Display synchronizing signal 16 is generated from display 13 and recording system clock 2 is generated from recording system clock generator 1. Decoding start controller 17 controls hold/skip timing and start timing of decoder 7.

Figure 2:
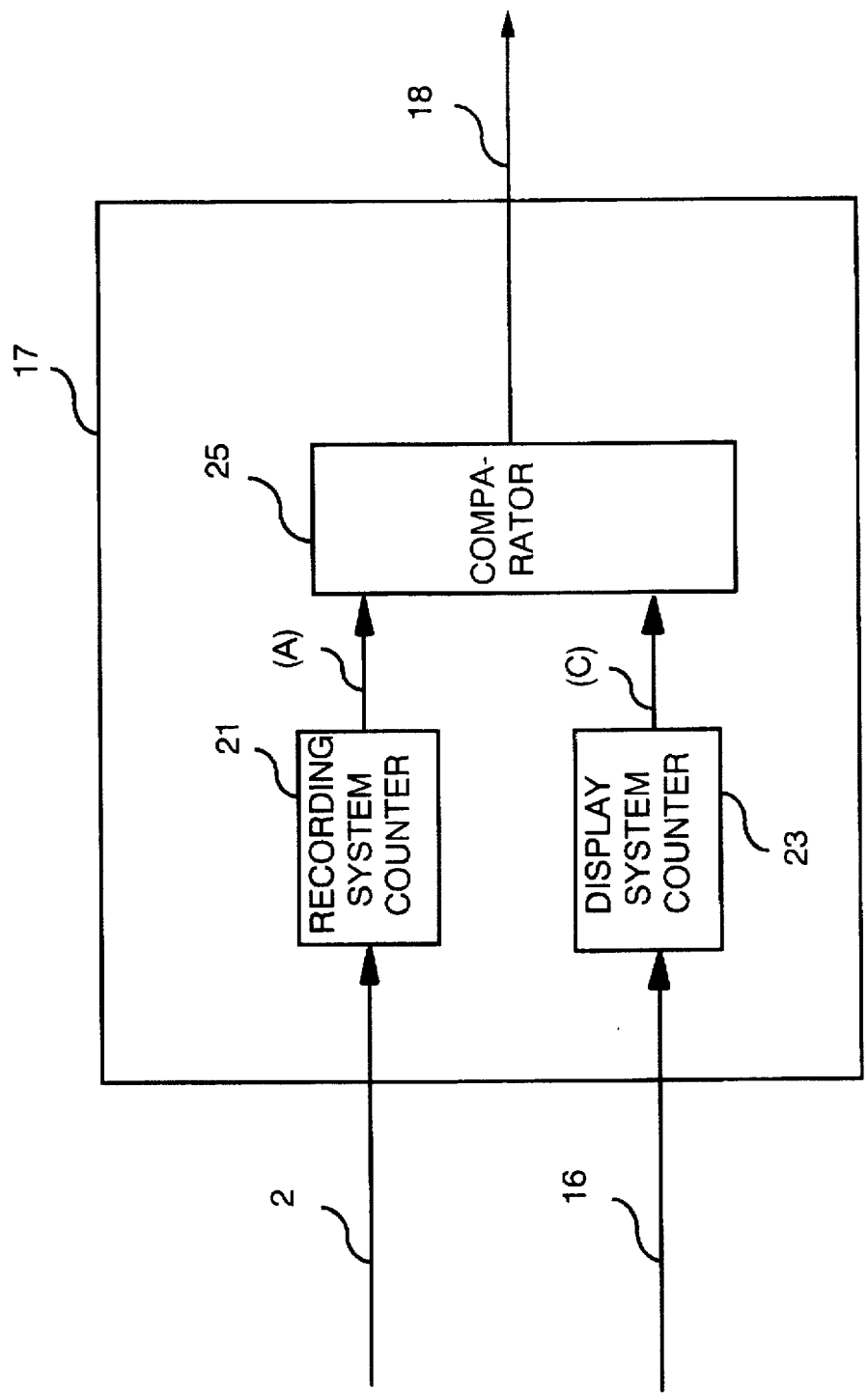
FIG. 2 shows a decoding start controller of the present invention.

FIG. 2 shows a decoding start controller of the present invention. In FIG. 2, the decoding start controller comprises a recording system counter 21, a display system counter 23, and a comparator 25. Comparator 25 compares recording system time (A) obtained by recording system counter 21 which counts recording system clock 2, with display system time (C) obtained by display system counter 23 which counts frame pulse and so on of display synchronizing signal 16. Comparator 25 outputs hold/skip and decoding pulse 18.

Embodiment 2

Figure 3:
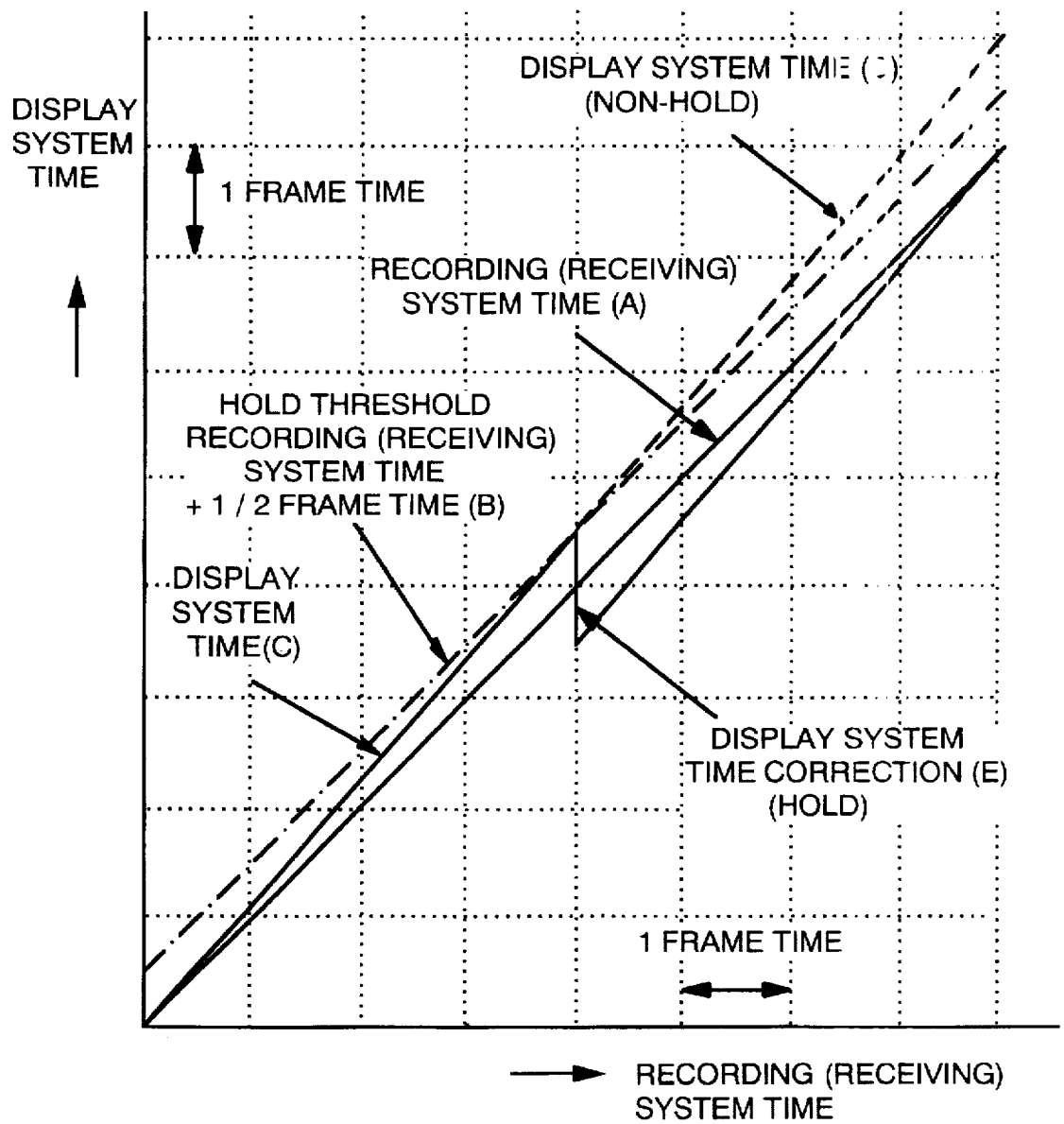
FIG. 3 shows a relationship between recording system time and display system time at holding of the present invention.

The method for synchronizing display system time (C) with recording system time (A) is explained as follows, which characterizes the present invention. FIG. 3 shows a relation between recording system time (A) and display system time (C) in case of a frame of display system time (C) being held. The horizontal axis of FIG. 3 indicates recording system time (A), and the vertical axis indicates display system time (C). Straight line (A) having gradient 1 from time 0 indicates recording system time (A). This is an instance in which recording system time (A) has 8 frames, and display system time (C) has 9 frames, within a certain period. In this case, a distance between display system time (C) and recording system time (A) becomes larger as time passes. A hold threshold straight line (B) is set upward straight line (A), which is parallel to straight line (A). This hold threshold straight line (B) is set by ½ frame time upward straight line (A), for instance. Since a frame of display system time (C) is 9/8 times as many as that of the recording system frame in this instance, display system time (C) separates gradually from straight line (A) as time passes.

In FIG. 3, display system time (C) separates gradually from straight line (A) as time passes since time 0, and meets with hold threshold straight line (B) at the beginning of the fifth frame of the horizontal axis. It means that display system time (C) advances by ½ frame from recording system time (A). In this invention, display system time (C) is delayed by 1 frame at this time. That is, as straight line (E) shows, display system time (C) is held by 1 frame. Display system time (C) is held by 1 frame at the fifth frame, and after then, as time passes, display system time (C) approaches gradually recording system time (A) and meets with recording system time (A) at the ninth frame. That is, display system time (C) goes on eighth frame when recording system time (A) goes on eighth frame, which appears that display system time (C) synchronizes with recording system time (A).

As described above, by holding display system time (C) by 1 frame when it meets with hold threshold straight line (B), display system time (C) appears to synchronize with recording system time (A) for a long time. In this case, though a frame of display system time (C) appears twice, this duplication of a single frame of display system time (C) hardly affects picture quality, since an actual frame difference between display system time (C) and recording system (A) is extremely small. Straight line (D) shows a line when display system time (C) is not held. If the display system time (C) goes along the straight line (D), display system time (C) advances by 9 frames while recording system time (A) advances by 8 frames for a certain time period. This causes display system time (C) not to synchronize with recording system (A), which results in disorder of the picture.

Figure 4:
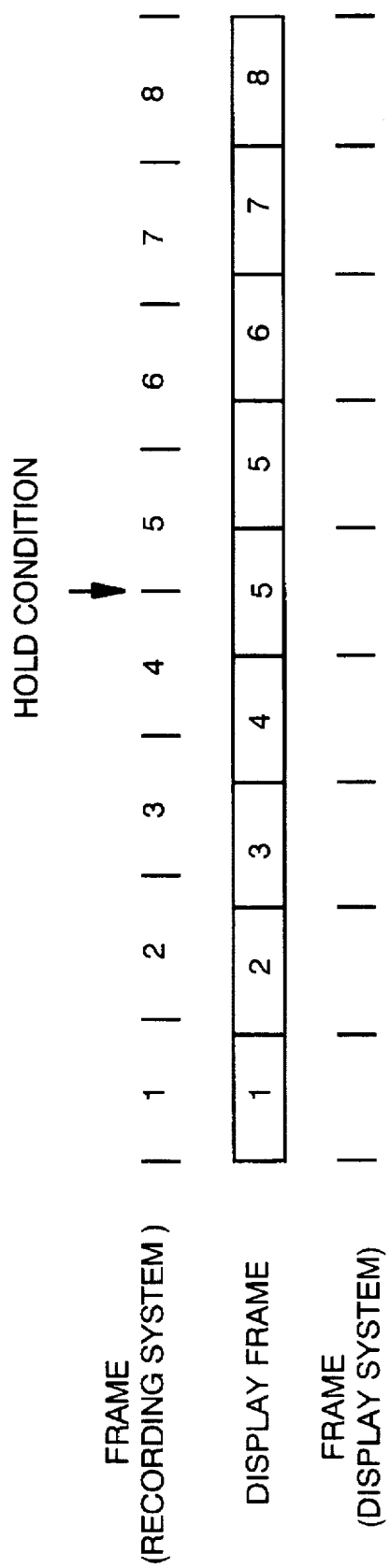
FIG. 4 shows a timing chart for hold control of the present invention.

FIG. 4 shows a relationship between frame numbers of the recording system to be displayed and those actually displayed under hold control. In FIG. 4, after the first 5 frames are displayed, holding is performed, and then the fifth frame is displayed again.

Figure 5:
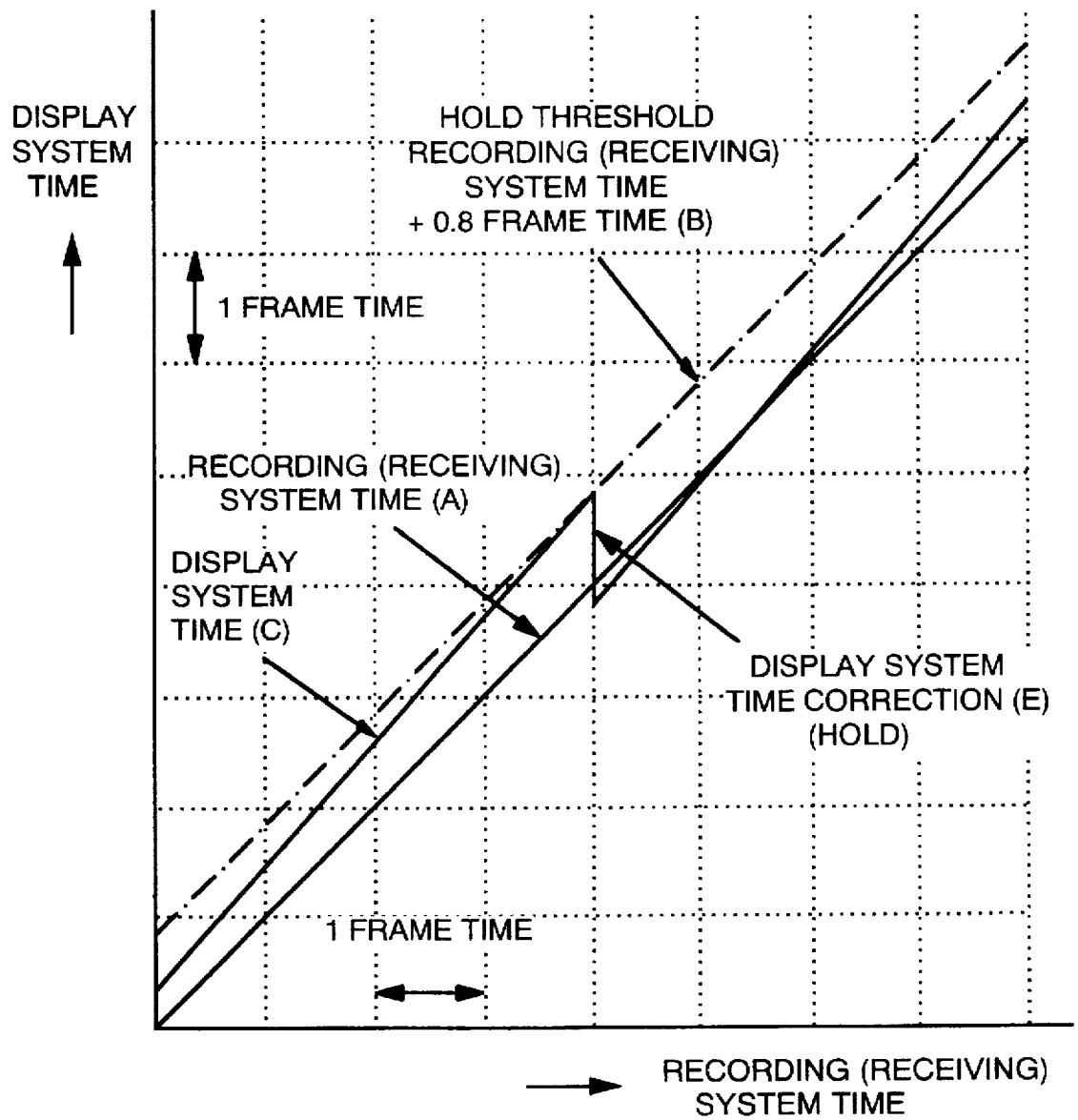
FIG. 5 shows a transition of the display system time when hold threshold is shifted upward.

FIG. 5 shows an example in which hold threshold (B) is shifted upward by 0.8 frames, for instance, in comparison with that in FIG. 3. In this case, display system time (C) also shifts upward which causes a significant difference in average from recording system time (A). That is, display time (C) is displayed earlier than recording system time (A) to be displayed, which causes asynchronous with sound. Therefore, in the present invention, as shown in FIG. 3, the hold threshold is shifted by ½ frame time upward from recording system time (A), so that display system time (C) is in accord with recording system time (A) in average.

Embodiment 3

Figure 6:
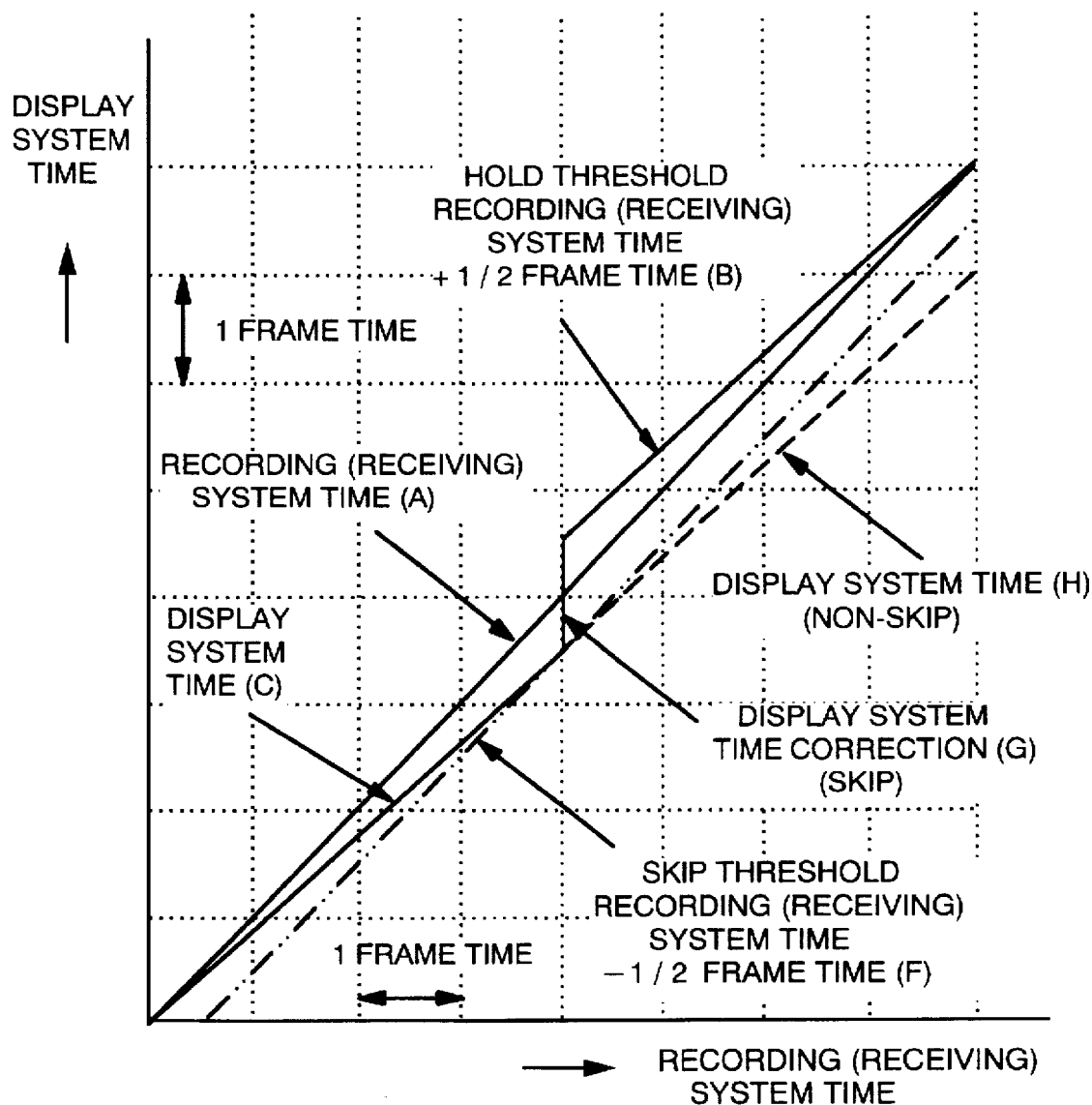
FIG. 6 shows a relationship between recording system time and display system time at skipping of the present invention.

FIG. 6 shows a relationship between recording system time (A) and display system time (C) when display system time (C) is skipped. This example shows a case that recording system time (A) goes at the rate of 8 frames and display system time (C) goes at the rate of 7 frames. Straight line (A) having gradient 1 indicates recording system time (A) since time 0. In this example, within a certain period, recording system time (A) has 8 frames and display system time (C) has 7 frames. Display system time (A) shifts gradually from recording system time (A) as time passes. Skip threshold line (F) is set in parallel and downward to straight line (A). This skip threshold from straight line (F) is set ½ frame time downward straight line (A), for instance. Since a frame of display system time (C) in this case is ⅞ times as many as that of recording system, display system time (C) shifts gradually downward from straight line (A) as time passes.

In FIG. 6, display system time (C) shifts gradually downward from straight line (A) since time 0 and meets with skip threshold line (F) at the fifth frame of horizontal axis. This means that display system time (C) is behind from recording system time (A) by ½ frames. In this invention, display system time (C) is put forward by 1 frame at this time. That is, display system time (C) is skipped by 1 frame as indicated in straight line (G). Display system time (C) is skipped by 1 frame at the fifth frame, and gradually approaches recording system time (A) as time passes since then, and meets with recording system time (A) at the ninth frame. That is, when display system time (C) goes on eighth frame, recording system time (A) goes on eighth frame, which appears that display system time (C) is synchronized with recording system time (A).

In this example, though display system time (C) synchronizes with recording system time (A) for every 8 frames for convenience of explanation, the actual number of frames is as many as hundreds or thousands frames and which is very long. If the frame to be skipped is not B picture, a next coming B picture is skipped. Straight line (H) shows a straight line when display system time (C) is not skipped. In this case, display system time (C) advances by 7 frames while recording system time (A) advances by 8 frames for a certain time period. This causes display system time (C) not to synchronize with recording system (A), which results in disorder of the picture.

Figure 7:
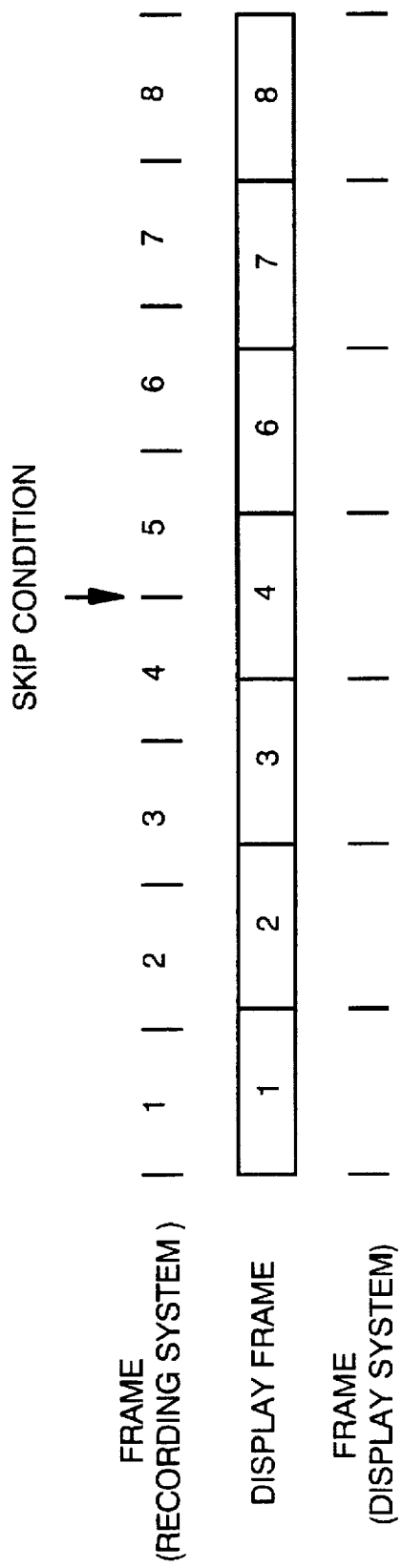
FIG. 7 shows a timing chart for skip control of the present invention.

FIG. 7 shows a relationship between the frame numbers of the recording system to be displayed and those actually displayed under skip control. In FIG. 7, after the fourth frame is displayed, the fifth frame is skipped to display the sixth frame.

Figure 8:
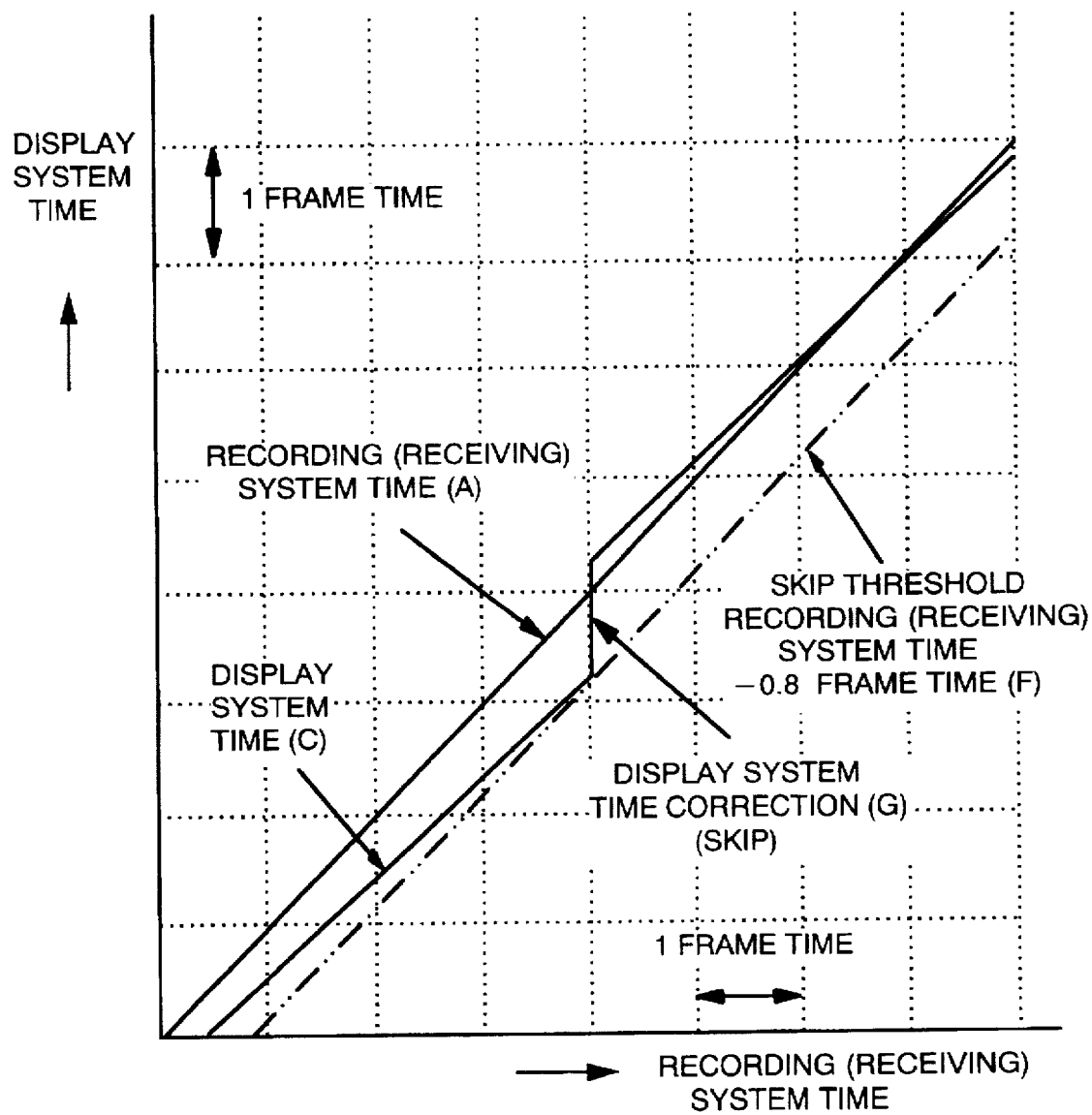
FIG. 8 shows a transition of the display system time when skip threshold is shifted below.

FIG. 8 shows an example of a larger skip than that in FIG. 6. In this case, skip threshold (F) is set by 0.8 frames downward recording system (A). In this case, display system time (C) also shifts downward largely, which results in that actual display delays than that to be displayed. Therefore, in the present invention, as shown in FIG. 6, this threshold is shifted by ½ frame time downward from recording system time (A), so that display system time (C) is in accord with recording system time (A) in average.

Embodiment 4

Figure 9:
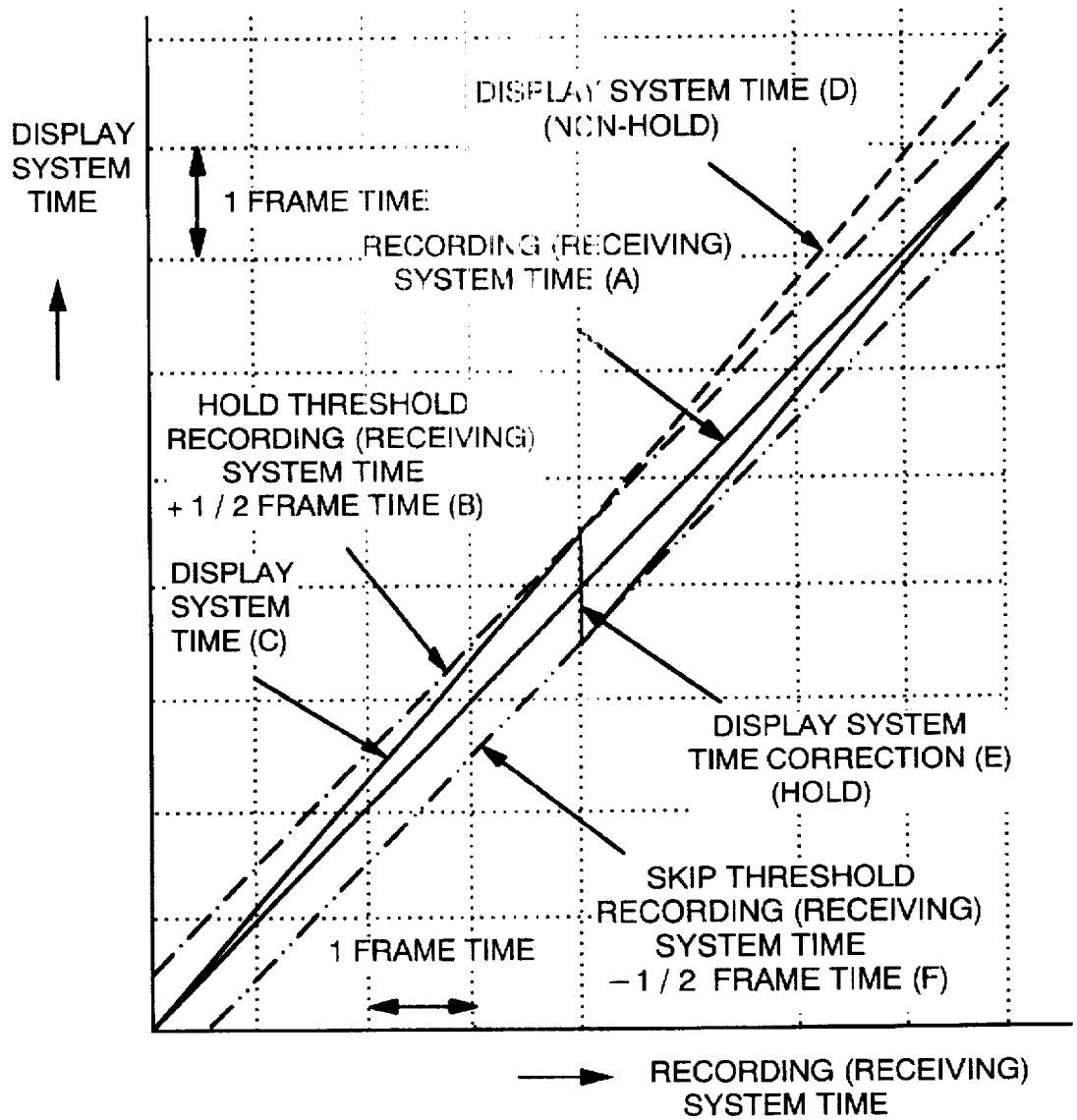
FIG. 9 shows a relationship between recording system time and display system time at holding and skipping of the present invention.

FIG. 9 shows a relationship between recording system time (A) and display system time (C) when display system time (C) is held and also skipped. In a fourth embodiment, hold threshold straight line (B) is set upward and in parallel to straight line (A), and skip threshold straight line (F) is set downward and in parallel to straight line (A). This hold threshold straight line (B) is set by ½ frame time upward from straight line (A), for instance. This skip threshold straight line (F) is set by ½ frame time downward straight line (A).

FIG. 9 shows a case that recording system time (A) goes at the rate of 8 frames and display system time (C) goes at the rate of 9 frames. Therefore, display system time (C) shifts gradually from recording system time (A) as time passes, and approaches hold threshold (B). If recording system time (A) goes at the rate of 8 frames and display system time (C) goes at the rate of 7 frames, display system time (C) shifts gradually from recording system time (A) as time passes, and approaches skip threshold (F). As described above, in the fourth embodiment, if the rate of display system time (C) is larger than that of recording system time (A), display system time (C) approaches the hold threshold (B), and if the rate of display system time (C) is smaller than that of recording system time (A), display system time (C) approaches skip threshold (F). Therefore, the present embodiment is available in a case where display system time (C) is faster in parts or slower in other parts than recording system time (A) which are caused by jitter and so on.

Figure 10:
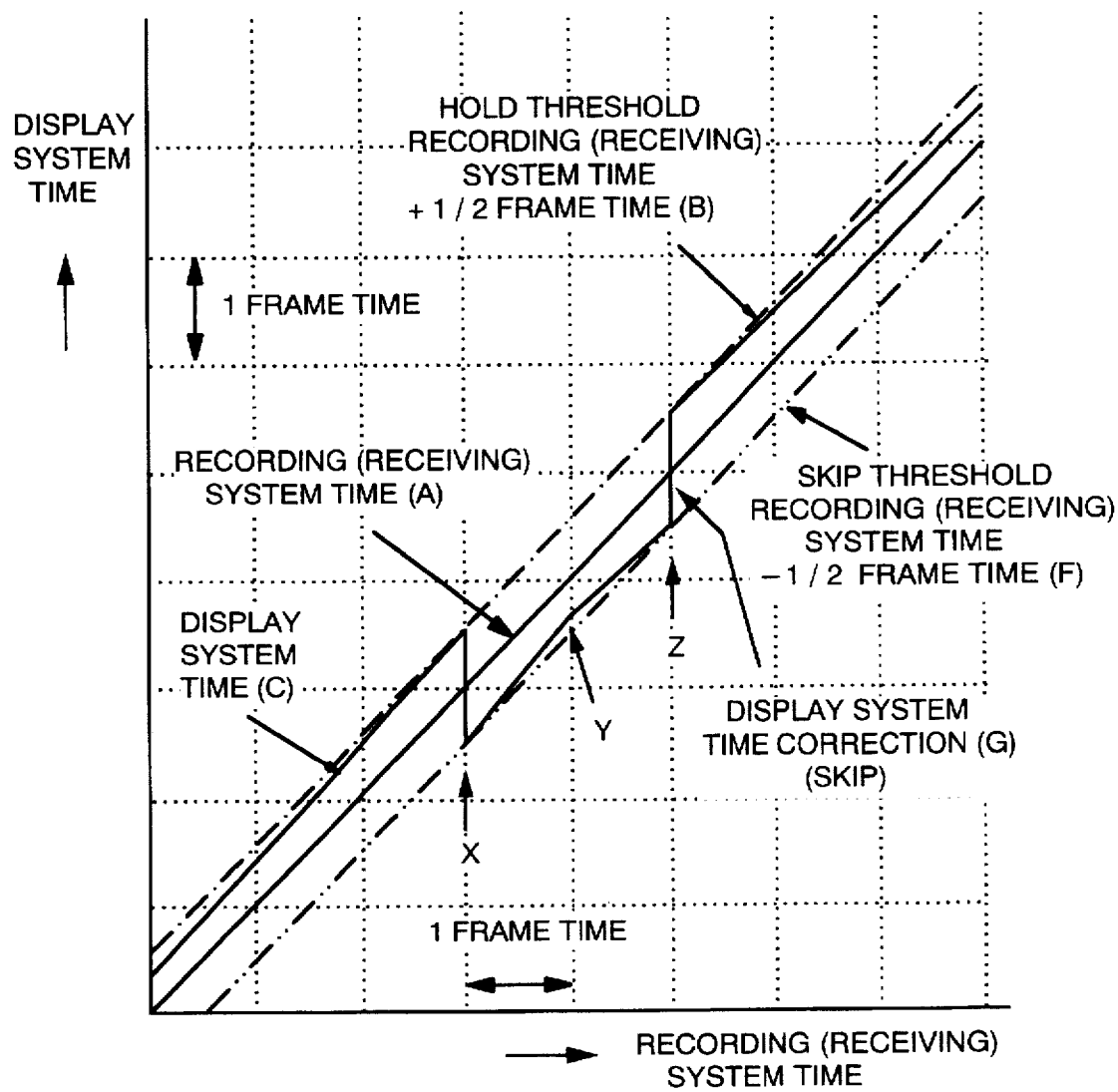
FIG. 10 shows a transition of the display system time with clock jitter without hysteresis characteristics.

FIG. 10 shows a transition of display system time (C) where display system varies by clock jitter when display system clock synchronizes approximately with recording system clock in FIG. 9 but without hysteresis characteristic. In FIG. 10, hold threshold (B) is set by ½ frames upward recording system time (A) and skip threshold (F) is set by ½ frames downward recording system time (A), respectively. Display system time (C) approaches gradually hold threshold (B) and meets with hold threshold (B) at point X, where display system time (C) is held. Then display system time (C) gradually shifts from skip threshold (F) since point X as time passes. However, when the clock varies by jitter at point Y, for instance, display system time (C) delays gradually as time goes from point Y and meets with skip threshold (F) at point Z, where display system time (C) is skipped. When jitter occurs so often, display system time (C) moves back and forth between hold threshold (B) and skip threshold (F), which hardly allows display system time (C) to synchronize with recording system time (A).

Embodiment 5

Figure 11:
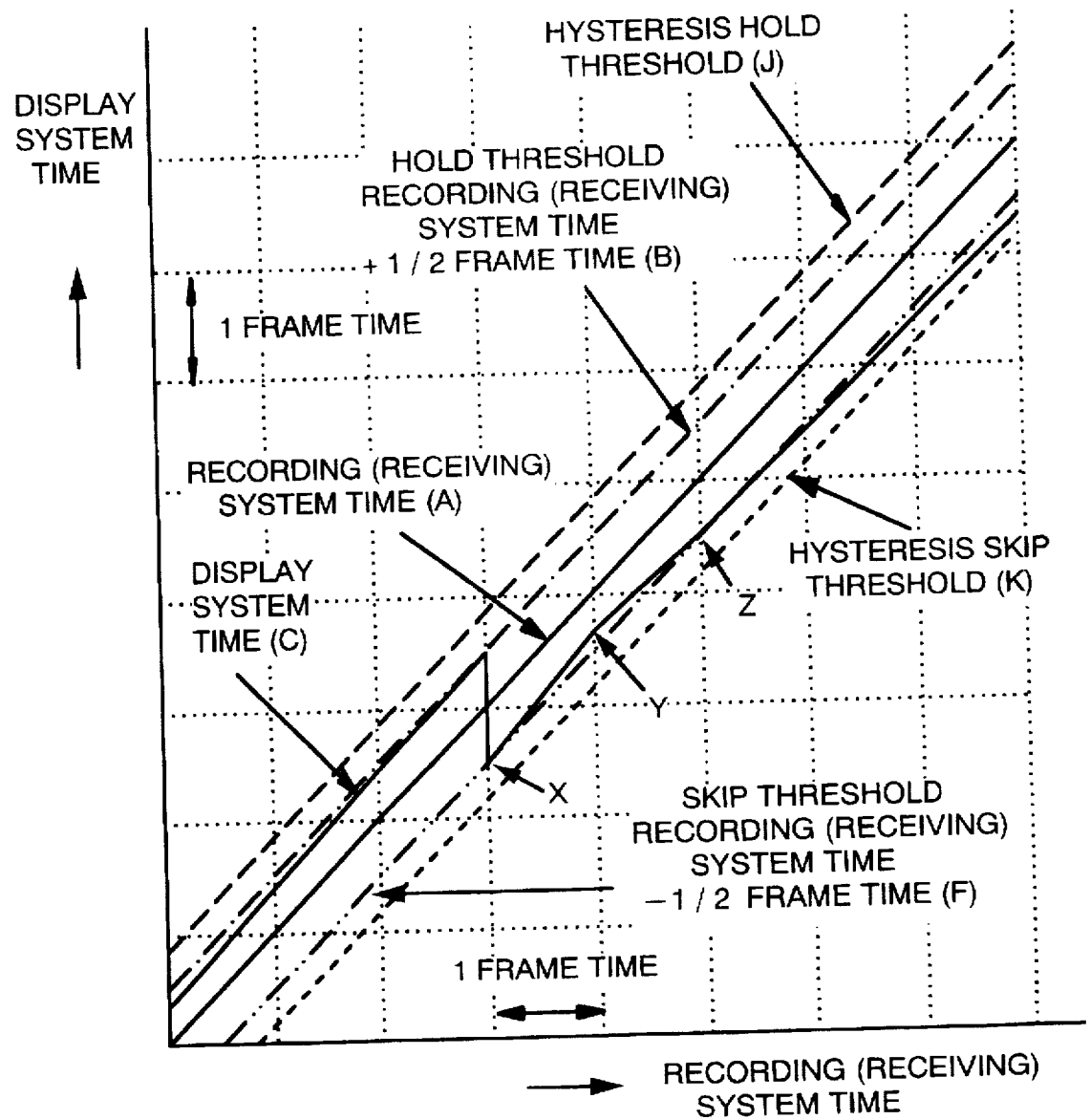
FIG. 11 shows a transition of the display system time with clock jitter and hysteresis characteristics.

The method of a fifth embodiment shown in FIG. 11 is used in order to solve the problem mentioned above. In FIG. 11, hysteresis hold threshold (J) is set upward from hold threshold (B) as shown in FIG. 9, and hysteresis skip threshold (K) is set downward from skip threshold (F). Skip after hold is performed when display system time (C) becomes equal to hysteresis skip threshold (K), and in the same way, hold after skip is performed when display system time (C) becomes equal to hysteresis hold threshold (J). In this way, repetition of hold and skip can be avoided even if a lot of jitters occur.

An operation in a case that hysteresis hold threshold (J) and hysteresis skip threshold (K) are added is explained in detail using FIG. 11. Display system time (C) gradually approaches hold threshold (B) and meets with hold threshold (B) at point X, where display system time (C) is held. Display system time (C) gradually shifts from the point X as time goes. Assume that jitter occurs at point Y, for instance, which causes display system time (C) to gradually delay as time goes from the point Y, and display system time (C) meets with skip threshold (K) at point Z. In this case, if display system time (C) meets with hysteresis skip threshold (E) at point Z, display system time (C) is not skipped there. Display system time (C) is not skipped until it meets with the next hysteresis skip threshold (K). Therefore, even if excessive jitter occurs, it is possible to decrease the repetition of hold and skip of display system time (C).

Embodiment 6

Figure 12:
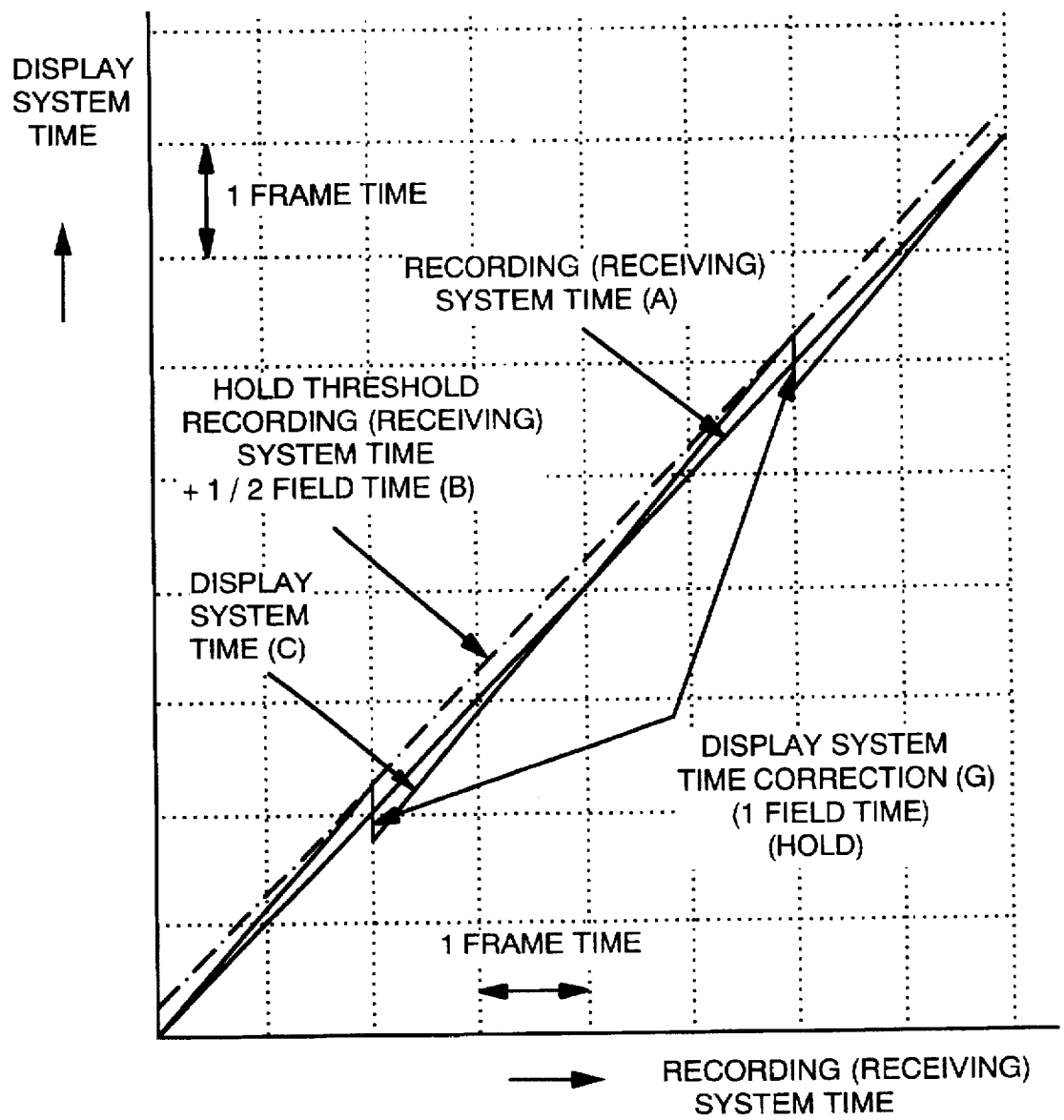
FIG. 12 shows a relationship between recording system time and display system time at holding under field control of the present invention.

In generally, pictures are decoded for every frame unit. In a case that a monitor as the display apparatus is an interlace type such as NTSC, control of the displayed picture of the second embodiment may be carded out by field unit not by frame unit. Hold threshold (B) in this case is set upward from recording system time (A) by ¼ frames, that is, +½ field, as shown in FIG. 12. When display system time (C) equals to hold threshold (B), display system time (C) is held by one field, that is, one field time is subtracted from display system time (C) to allow display system time (C) to approach recording system time (A).

Figure 13:
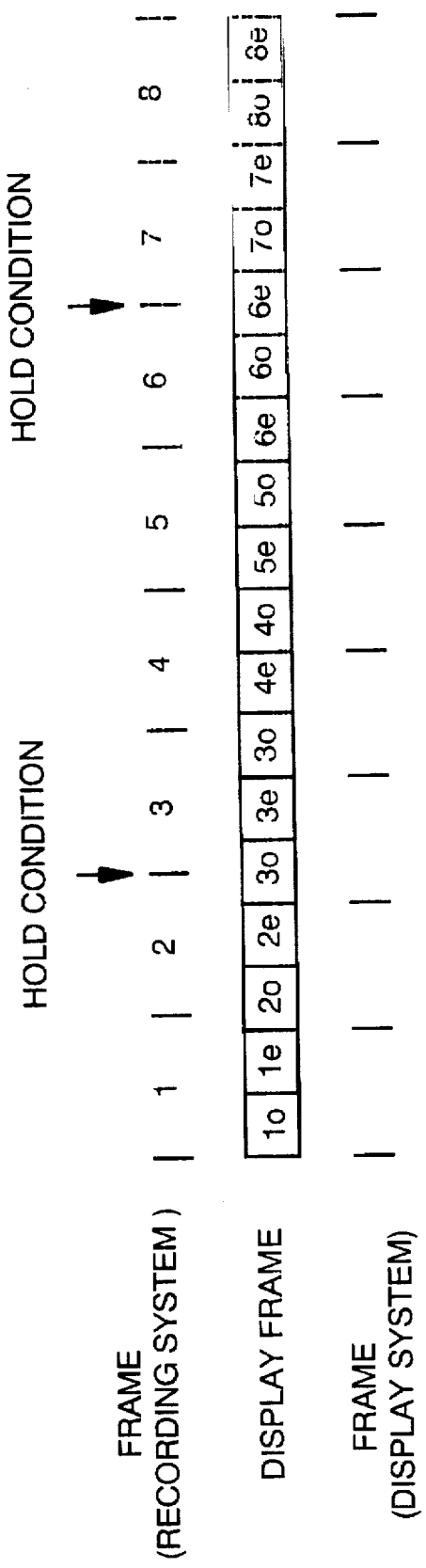
FIG. 13 shows a timing chart of hold control under the field unit of the present invention.
Figure 14:
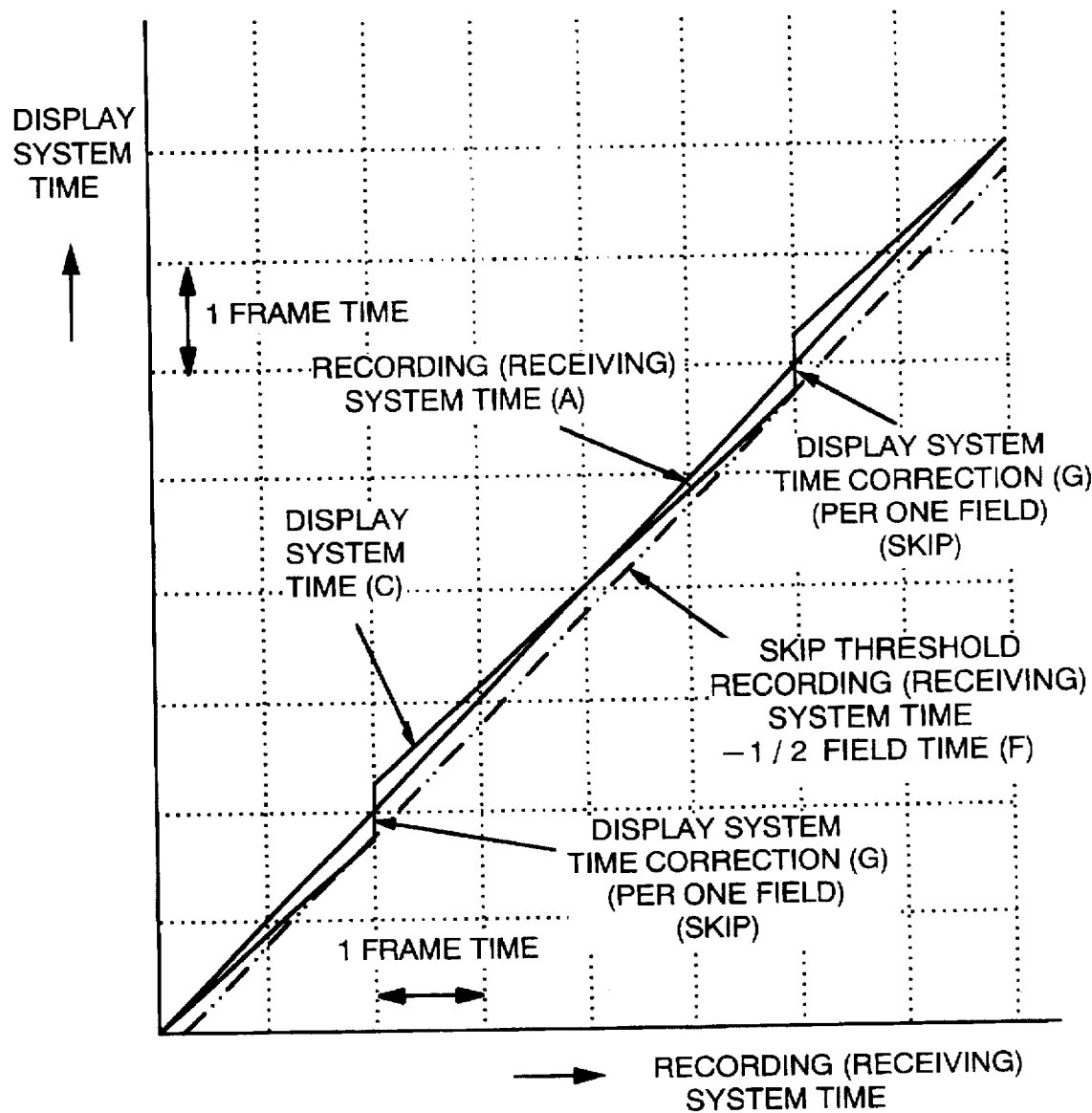
FIG. 14 shows a relationship between recording system time and display system time at skipping under field control of the present invention.

FIG. 13 shows frame numbers of recording system (A) to be displayed under hold control, and frame numbers actually displayed, and also distinction between odd number field (o)

and even number field (e). In FIG. 13, after the first 3e and 3o are displayed, 3o is displayed again by hold operation. After the first 6e and 6o are displayed, 6e is displayed again by hold operation. In the sixth embodiment, the picture is smoothly displayed in comparison with that in the second embodiment where picture output is under hold control of frame unit.

Embodiment 7

In the sixth embodiment, hold control for displaying pictures is shown in the type of field unit but not in the type of frame unit. In the seventh embodiment, skip control of display system time (C) is carded out in the type of field unit. In this case, skip threshold (F) is set downward from recording system time (A) by ¼ frame, that is, –½ field. When display system time (C) becomes equal to skip threshold (F), display system time (C) is skipped for 1 field, that is, 1 field time is added to display system time (C), which allows display system time (C) to begin to approach recording system time (A).

Figure 15:
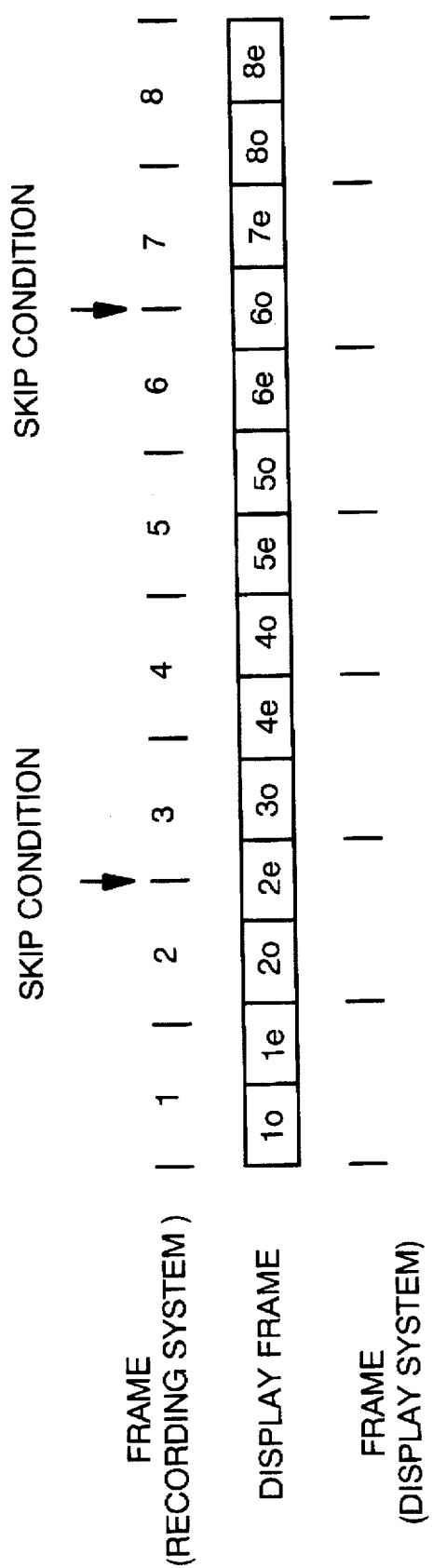
FIG. 15 shows a timing chart of skip control under the field unit of the present invention.

FIG. 15 shows frame numbers of recording system (A) to be displayed under skip control, and frame numbers actually displayed, and also distinction between odd number field (o) and even number field (e). In FIG. 15, after the first 2e and 3o are displayed, 3e is skipped by skip operation. After the first 6o and 7e are displayed, 7o is skipped by skip operation. In the seventh embodiment, the picture is smoothly displayed in comparison with that in the third embodiment where picture output is under skip control of frame unit.

Embodiment 8

In the present invention, even when a frame rate of the recording system is different from that of the display system, it is possible to use the moving picture reproducing apparatus of the present embodiment in FIG. 1 without modifying its construction to carry out decoding and extension. For instance, when the picture format of recording apparatus 3 is NTSC, and the picture format of monitor 15 is PAL, the number of moving pictures transferred from recording apparatus 3 is approximately 30 frames/second, and the number of moving pictures of display system is 25 frames/second. Even in the above case, it is possible to display the pictures smoothly using the skip operation of the third embodiment.

Alternatively, when the picture format of recording apparatus 3 is PAL and the picture format of monitor 15 is NTSC, the number of moving picture transferred from recording apparatus 3 is 25 frames/second, and the number of moving picture of display system is approximately 30 frames/second. Even in the above case, it is possible to display the pictures smoothly using the hold operation of the third embodiment.

Embodiment 9

It is possible to use the moving picture reproducing apparatus of the present embodiment in FIG. 1 without modifying its construction to display the stored medium by increasing the frequency of recording system clock 2, and by transferring the compressed data from recording unit 3 at a higher rate than usual. In this case, the skip operation of the third embodiment is carried out, then smooth and rapid reproducing may be possible.

On the contrary, it is possible to perform display by means of decreasing a frequency of recording system clock 2, and transferring the compressed data from recording unit 3 at a lower rate than usual. In this case, the hold operation of the second embodiment is carried out, then smooth and rapid reproducing may be possible.

What is claimed is:

1. A method for extending and reproducing compressed moving pictures in a system where a display system clock from a display unit is asynchronous with a data transferring clock from a recording unit or receiving unit (referred to as recording unit) comprising the steps of:

setting a hold threshold time which is in advance of a recording system or receiving system time (referred to as recording system time) by a predetermined frame time period; and correcting a timing by holding a display system time for one displaying frame when the display system time becomes equal to said hold threshold time;

wherein the moving pictures are displayed in response to the corrected display system time.

2. A method for extending and reproducing compressed moving pictures in a system where a display system clock from a display unit is asynchronous with a data transferring clock from a recording unit or receiving unit (referred to as recording unit) comprising the steps of:

setting a skip threshold time which is behind from a recording system or receiving system time (referred to as recording system time) by a predetermined frame time period; and correcting a timing by skipping a display system time for one displaying frame when the display system time becomes equal to said skip threshold time;

wherein the moving pictures are displayed in response to the corrected display system time.

3. A method for extending and reproducing compressed moving pictures in a system where a display system clock from a display unit is asynchronous with a data transferring clock from a recording unit or receiving unit (referred to as recording unit) comprising the steps of:

setting a hold threshold time which is in advance of a recording system or receiving system time (referred to as recording system time) by a first predetermined flame time period;

correcting a timing by holding a display system time for one displaying frame when the display system time becomes equal to said hold threshold time;

setting a skip threshold time which is behind from the recording system time by a second predetermined flame time period; and correcting the timing by skipping the display system time for one displaying frame when the display system time becomes equal to said skip threshold time.

wherein the moving pictures are displayed in response to the corrected display system time.

4. A method for extending and reproducing compressed moving pictures in a system where a display system clock from a display unit is asynchronous with a data transferring clock from a recording unit or receiving unit (referred to as recording unit) comprising the steps of:

setting a hold threshold time which is in advance of a recording system or receiving system time (referred to as recording system time) by a first predetermined frame time period;

setting a skip threshold time which is behind from the recording system time by a second predetermined frame time period;

setting a hysteresis hold threshold time which is in advance of the hold threshold time by a third predetermined frame time period;

setting a hysteresis skip threshold time which is behind from the skip threshold time by a fourth predetermined frame time period;

correcting a timing by holding a display system time for one displaying frame when the display system becomes equal to said hold threshold time, and then by skipping the display system time when the display system time becomes equal to the hysteresis skip threshold time after correcting the timing by holding; and correcting the timing by skipping the display system time for one displaying frame when the display system time becomes equal to said skip threshold time, and then by holding the display system time when the display system time becomes equal to the hysteresis hold threshold time after correcting the timing by skipping.

5. The method for extending and reproducing compressed moving picture of claim 1 wherein:

said predetermined frame time period is ½ frame time period.

6. The method for extending and reproducing compressed moving picture of claim 2 wherein:

said predetermined frame time period is ½ frame time period.

7. The method for extending and reproducing compressed moving picture of claim 3 wherein:

said first and second predetermined frame time periods are ½ frame time period.

8. The method for extending and reproducing compressed moving picture of claim 4 wherein:

said first and second predetermined frame time periods are ½ frame time period; and said third and fourth predetermined frame time periods are less than ½ frame time period.

9. A method for extending and reproducing compressed moving pictures in a system where a display system clock from a display unit is asynchronous with a data transferring clock from a recording unit or receiving unit (referred to as recording unit) comprising the steps of:

setting hold threshold time which is in advance of a recording system or receiving system time (referred to as recording system time) by a predetermined field time period; and correcting a timing by holding a display system time for one displaying field when the display system time becomes equal to said hold threshold time;

wherein the moving pictures are displayed in response to the corrected display system time.

10. A method for extending and reproducing compressed moving pictures in a system where a display system clock from a display unit is asynchronous with a data transferring clock from a recording unit or receiving unit (referred to as recording unit comprising the steps of:

setting a skip threshold time which is behind from a recording system or receiving system time (referred to as recording system time) by a predetermined field time period; and correcting a timing by skipping a display system time for one displaying field when the display system time becomes equal to said skip threshold time; wherein the moving pictures are displayed in response to the corrected display system time.

11. A method for extending and reproducing compressed moving pictures in a system where a display system clock from a display unit is asynchronous with a data transferring clock from a recording unit or receiving unit (referred to as recording unit) comprising the steps of:

setting a hold threshold time which is in advance of a recording system or receiving system time (referred to as recording system time) by a first predetermined field time period;

correcting a timing by holding a display system time for one displaying field when the display system time becomes equal to said hold threshold time;

setting a skip threshold time which is behind from the recording system time by a second predetermined field time period; and correcting the timing by skipping the display system time for one displaying field when the display system time becomes equal to said skip threshold time;

wherein the moving pictures are displayed in response to the corrected display system time.

12. A method for extending and reproducing compressed moving pictures in a system where a display system clock from a display unit is asynchronous with a data transferring clock from a recording unit or receiving unit (referred to as recording unit) comprising the steps of:

setting a hold threshold time which is in advance of a recording system time by a first predetermined field time period;

setting a skip threshold time which is behind from a recording system or receiving system time (referred to as recording system time) by a second predetermined field time period;

setting a hysteresis hold threshold time which is in advance of the hold threshold time by a third predetermined field time period;

setting a hysteresis skip threshold time which is behind from the skip threshold time by a fourth predetermined field time period;

correcting a timing by holding a display system time for one displaying field when the display system time becomes equal to said hold threshold time, and then by skipping the display system time when the display system time becomes equal to the hysteresis skip threshold time after correcting the timing by holding; and correcting the timing by skipping the display system time for one displaying field when the display system time becomes equal to said skip threshold time, and then by holding the display system time when the display system time becomes equal to the hysteresis hold threshold time after correcting the timing by skipping.

13. The method for extending and reproducing compressed moving picture of claim 9 wherein:

said predetermined field time period is ½ field time period.

14. The method for extending and reproducing compressed moving picture of claim 10 wherein:

said predetermined field time period is ½ field time period.

15. The method for extending and reproducing compressed moving picture of claim 11 wherein:

said first and second predetermined field time periods are ½ field time period.

16. The method for extending and reproducing compressed moving picture of claim 12 wherein:

said first and second predetermined field time periods are ½ field time period, and said third and fourth predetermined field time periods are less than ½ field time period.

17. The method for extending and reproducing compressed moving picture of claim 1 wherein:

the recording unit and the display unit each has a different frame speed.

18. The method for extending and reproducing compressed moving picture of claim 2 wherein:

the recording unit and the display unit each has a different frame speed.

19. The method for extending and reproducing compressed moving picture of claim 3 wherein:

the recording unit and the display unit each has a different frame speed.

20. The method for extending and reproducing compressed moving picture of claim 1 wherein:

the picture data is reproduced by controlling a transfer rate of bit stream and controlling a decoding frame between the recording unit and display unit each having different frame speeds.

21. The method for extending and reproducing compressed moving picture of claim 2 wherein:

the picture data is reproduced by controlling a transfer rate of bit stream and controlling a decoding frame between the recording unit and display unit each having different frame speeds.

22. The method for extending and reproducing compressed moving picture of claim 3 wherein:

the picture data is reproduced by controlling a transfer rate of bit stream and controlling a decoding frame between the recording unit and display unit each having different frame speeds.

23. An apparatus for extending and reproducing compressed moving pictures which comprises a recording unit having a picture source, a recording system clock generator for generating a clock synchronized with the picture source, a buffer memory for storing a read out picture data, a decoder for decoding the picture data, a display for converting the picture data to an image signal for display, a monitor for displaying the picture, and a display system clock generator for generating a clock for display, comprising:

a decoding start control portion comprising a recording system counter for counting a recording system clock, a display system counter for counting a display system clock, and a comparator for;

generating a hold pulse to the decoder when a value from the display system counter becomes equal to a hold threshold value which is in advance of a value from the recording system counter by ½ frame time period; and wherein the decoder holds the output thereof for one displaying frame when having received the hold pulse.

24. An apparatus for extending and reproducing compressed moving pictures which comprises a recording unit having a picture source, a recording system clock generator for generating a clock synchronized with the picture source, a buffer memory for storing a read out picture data, a decoder for decoding the picture data, a display for converting the picture data to an image signal for display, a monitor for displaying the picture, and a display system clock generator for generating a clock for display, comprising:

a decoding start control portion comprising a recording system counter for counting a recording system clock, a display system counter for counting a display system clock, and a comparator for;

generating a skip pulse to the decoder when a value from the display system counter becomes equal to a skip threshold value which is behind from a value from the recording system counter by ½ frame time period; and wherein the decoder skips the output thereof for one frame when having received the skip pulse.

25. An apparatus for extending and reproducing compressed moving pictures which comprises a recording unit having a picture source, a recording system clock generator for generating a clock synchronized with the picture source, a buffer memory for storing a read out picture data, a decoder for decoding the picture data, a display for converting the picture data to an image signal for display, a monitor for displaying the picture, and a display system clock generator for generating a clock for display, comprising:

a decoding start control portion comprising a recording system counter for counting a recording system clock, a display system counter for counting a display system clock, and a comparator for generating a hold pulse and a skip pulse to the decoder, the hold pulse generated at the time when a value from the display system counter becomes equal to a hold threshold value which is in advance of a value from the recording system counter by ½ frame time period, the skip pulse generated at the time when a value from the display system counter becomes equal to a skip threshold value which is behind from a value from the recording system counter by ½ frame time period; and wherein the decoder holds the output thereof for one displaying frame when having receiving the hold pulse and skips the output thereof for one displaying frame when having received the skip pulse.

26. An apparatus for extending and reproducing compressed moving pictures which comprises a recording unit having a picture source, a recording system clock generator for generating a clock synchronized with the picture source, a buffer memory for storing a read out picture data, a decoder for decoding the picture data, a display for converting the picture data to an image signal for display, a monitor for displaying the picture, and a display system clock generator for generating a clock for display, comprising:

a decoding start control portion comprising a recording system counter for counting a recording system clock, a display system counter for counting a display system clock, and a comparator for generating first and second hold pulses, and first and second skip pulses to the decoder, the first hold pulse generated at the time when a value from the display system counter becomes equal to a hold threshold value which is in advance of a value from the recording system counter by ½ frame time the first skip pulse generated at the time when the value from the display system counter becomes equal to a skip threshold value which is behind from the value from the recording system counter by ½ frame time period;

the second hold pulse generated at the time when the value from the display system counter becomes equal to a hysteresis hold threshold value which is further ahead of the hold threshold value, and the second skip pulse generated at the time when the value from the display system counter becomes equal to a hysteresis skip threshold value which is further behind from the skip threshold value, wherein the decoder holds the output thereof for one displaying frame when having received the first and second hold pulses, and skips the output thereof for one displaying frame when having received the first and second skip pulses.

27. An apparatus for extending and reproducing compressed moving pictures which comprises a recording unit having a picture source, a recording system clock generator for forming a clock synchronized with the picture source, a buffer memory for storing a read out picture data, a decoder for decoding the picture data, a display for converting the picture data to an image signal for display, a monitor for displaying the picture, and a display system clock generator for generating a clock for display, comprising:

a decoding start control portion comprising a recording system counter for counting a recording system clock, a display system counter for counting a display system clock, and a comparator for generating a hold pulse to the decoder when a value from the display system counter becomes equal to a hold threshold value which is in advance of value from the recording system counter by ½ field time period; and wherein the decoder holds the output thereof for one field when having received the hold pulse.

28. An apparatus for extending and reproducing compressed moving pictures which comprises a recording unit having a picture source, a recording system clock generator for forming a clock synchronized with the picture source, a buffer memory for storing a read out picture data, a decoder for decoding the picture data, a display for convening the picture data to an image signal for display, a monitor for displaying the picture, and a display system clock generator for generating a clock for display, comprising:

a decoding start control portion comprising a recording system counter for counting a recording system clock, a display system counter for counting a display system clock, and a comparator for generating a skip pulse to the decoder when a value from the display system counter becomes equal to a skip threshold value which is behind from a value from recording system counter by ½ field time period; and wherein the decoder skips the output thereof for one displaying field when having received the skip pulse.

29. An apparatus for extending and reproducing compressed moving pictures which comprises a recording unit having a picture source, a recording system clock generator for generating a clock synchronized with the picture source, a buffer memory for storing a read out picture data, a decoder for decoding the picture data, a display for converting the picture data to an image signal for display, a monitor for displaying the picture, and a display system clock generator for generating a clock for display, comprising:

a decoding start control portion comprising a recording system counter for counting a recording system clock, a display system counter for counting a display system clock, and a comparator for;

generating a hold pulse and a skip pulse to the decoder, the hold pulse generated at the time when a value from the display system counter becomes equal to a hold threshold value which is in advance of a value from the recording system counter by ½ field time period, the skip pulse generated at the time when a value from the display system counter becomes equal to a skip threshold value which is behind from a value from the recording system counter by ½ field time period; and wherein the decoder holds the output thereof for one displaying field when having received the hold pulse and skips the output thereof for one displaying field when having received the skip pulse.

30. An apparatus for extending and reproducing compressed moving pictures which comprises a recording unit having a picture source, a recording system clock generator for generating a clock synchronized with the picture source, a buffer memory for storing a read out picture data, a decoder for decoding the picture data, a display for converting the picture data to an image signal for display, a monitor for displaying the picture, and a display system clock generator for generating a clock for display, comprising:

a decoding start control comprising a recording system counter for counting a recording system clock, a display system counter for counting a display system clock, and a comparator for generating first and second hold pulses, and first and second skip pulses to the decoder, the first hold pulse generated at the time when a value from the display system counter becomes equal to a hold threshold value which is in advance of a value from the recording system counter by ½ field time period, the first skip pulse generated at the time when the value from the display system counter becomes equal to a skip threshold value which is behind from the value from the recording system counter by ½ field the second hold pulse generated at the time when the value from the display system counter becomes equal to a hysteresis hold threshold value which is further ahead of the hold threshold value, and the second skip pulse generated at the time when the value from the display system counter becomes equal to a hysteresis skip threshold value which is further behind from the skip threshold value, wherein the decoder holds the output thereof for one field when having received the first and second hold pulses, and skips the output thereof for one field when having received the first and second skip pulses.

31. In an apparatus for reading out compressed moving picture data in response to a recording system clock, decoding the readout compressed moving data by a decoder, and converting the decoded data to an image signal in response to a display system clock, wherein:

the apparatus holds the decoded data output from the decoder for a predetermined time period and subtracts a value corresponding to the predetermined time period from the counted value of the displaying system clock, if a counted value of the display system clock becomes equal to a hold threshold value which is obtained by adding the first predetermined value to the counted value of the recording system clock, the apparatus does not skip the decoded data output from the decoder unless the counted value of the displaying system clock reaches a hysteresis skip threshold value which is obtained by subtracting a fourth predetermined value from a skip threshold value which is obtained by subtracting a second predetermined value from the counted value of the recording system clock, and skips the decoded data output from the decoder for a predetermined time period and adds a value corresponding to the predetermined time period to the counted value of the displaying system clock, if the displaying system clock becomes equal to the hysteresis skip threshold value, alternatively, the apparatus skips the decoded data output from the decoder for a predetermined time period and adds a value corresponding to the predetermined time period to the counted value of the displaying system clock, if a counted value of the display system clock becomes equal to a skip threshold value which is obtained by subtracting a second predetermined value from the counted value of the recording system clock, the apparatus does not holds the decoded data output from the decoder unless the counted value of the displaying system clock reaches a hysteresis hold threshold value which is obtained by adding a third predetermined value to the hold threshold value which is obtained by adding a second predetermined value to the counted value of the recording system clock, and holds the decoded data output from the decoder for a predetermined time period and subtracts a value corresponding to the predetermined time period from the counted value of the displaying system clock, if the displaying system clock becomes equal to the hysteresis hold threshold value.

32. The apparatus according to claim 31, wherein said predetermined time period is one frame time period, and said first and second predetermined values are values corresponding to ½ frame time period.

33. The apparatus according to claim 31, wherein said predetermined time period is one field time period, and said first and second predetermined time periods are values corresponding to ½ field time period.

* * * * *